United States Patent [19]

Kani

[11] Patent Number: 4,516,465
[45] Date of Patent: May 14, 1985

[54] DEVICE FOR GUIDING A PLAYER IN PERFORMANCE OF A KEYBOARD INSTRUMENT

[76] Inventor: Hirofumi Kani, 264-29, Takata-cho, Kohoku-ku, Yokohama-shi, Kanagawa-ken, Japan

[21] Appl. No.: 476,732

[22] Filed: Mar. 18, 1983

[51] Int. Cl.³ ............................................. G09B 15/08
[52] U.S. Cl. .................................. 84/470 R; 84/478; 84/482
[58] Field of Search ................... 84/1.28, 96, 97, 95 C, 84/478, 477 R, 470, 481, 482, 479, 480

[56] References Cited

U.S. PATENT DOCUMENTS 3,709,085  1/1973  Del Castillo ........................... 84/478
3,744,366  7/1973  Del Castillo ........................... 84/478
4,037,511  7/1977  Del Castillo ........................... 84/478

Primary Examiner—A. D. Pellinen
Assistant Examiner—Todd E. DeBoer
Attorney, Agent, or Firm—Jordan and Hamburg

[57] ABSTRACT

A device for guiding a player in his or her performance of a keyboard instrument is comprised of a movable indicator having a predetermined number of indicating or display elements registering with respective ones of the keys on the keyboard occasionally covered by the movable indicator. The shape of a predetermined number of musical notes are displayed on the indicating elements for sequentially specifying the keys to be acted upon during performance, the indicator being shifted in case of necessity to enable such sequential designation of the keys and to visualize the player's arm movement during performance. A plate may be optionally provided to have the chord part played automatically while the player is playing the melody part under instructions given by the movable indicator.

20 Claims, 20 Drawing Figures

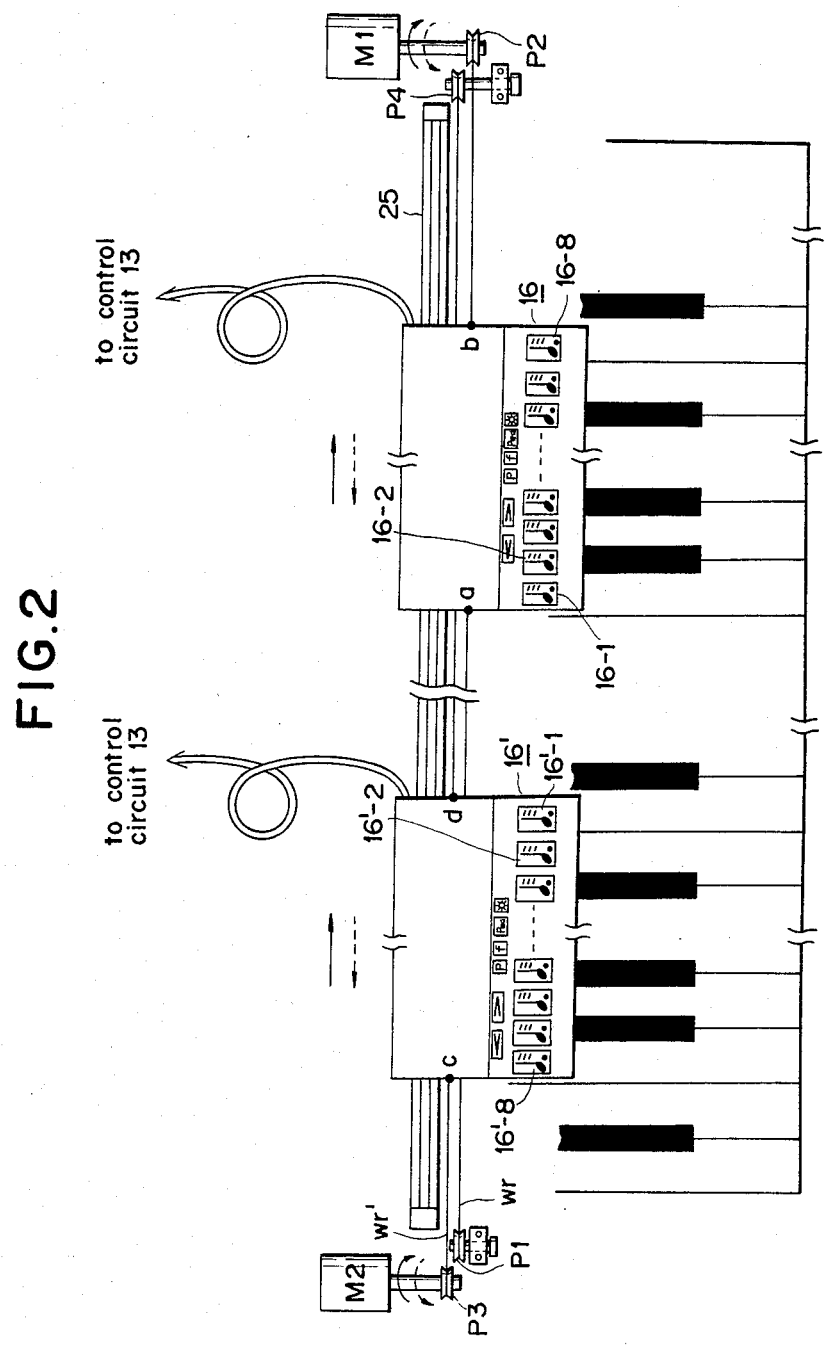

DEVICE FOR GUIDING A PLAYER IN PERFORMANCE OF A KEYBOARD INSTRUMENT

BACKGROUND OF THE INVENTION

1. Field of the Invention

This invention relates to a device for guiding a player in performance of a keyboard instrument such as piano, organ or reed-organ and more particularly to such device in which movable indicating plates each provided with a suitable number of indicating elements capable of indicating the pitch and occasionally the duration of musical notes are mounted to the instrument so that the player may play the tune under instructions given by the indicating elements.

The device of the present invention is highly useful to those unable to read a musical score or to those versed in reading a musical score but unable to correctly strike key as indicated on the musical score.

2. Prior Art

It has been practiced in the prior art to incorporate a small size computer such as micro-processor into a keyboard instrument, such micro-processor storing all data concerning a tune in the binary form for automatically carrying out a performance upon its actuation. Such instrument with a built-in counter is naturally inconvenient in that it does not permit a player to play as he desires.

A chord indicating device used with keyboard instruments and adpated for indicating only chord keys to a player during performance of a time is known from a Japanese Utility Model Publication No. 42169/1974. In sum, the device of the said publication comprises a plurality of melody switches driven by the respective melody keys during operation thereof, a matrix circuit in which these switches are connected in columns, and a plurality of indicating lamps to which are connected respective output leads from said matrix circuit and which may be illuminated by output signals supplied on these leads, said indicating lamps corresponding to the respective pitch levels of at least one octave and said matrix circuit being operable upon striking of melody keys and resulting actuation of said melody switches to illuminate the indicating lamps of the chord keys corresponding to the pitch of the melody keys.

The basic concept of this device is that, when a tune contains both a melody part and a chord part, it is often difficult for a player to strike the chord keys with his left hand, even if he can play the melody portion with his right hand while reading a musical score. In view of this, the indicating device of the prior art is designed for indicating the chord key to the player through the medium of indicating lamps each corresponding to a chord key to be depressed simultaneously with a given melody key.

With this prior art device, the player is naturally required to be able to read a musical score for performance at least of the melody portion. Therefore, this device may not be used by one unable to read a score or select out a correct key indicated on the score. Moreover, considerable difficulties may be met in locating the chord key indicated by the lamps, while the player is playing the melody portion with his right hand, especially in cases where two or more keys are to be acted upon simultaneously to give the chord effects.

In order to obviate these inconveniences of the prior art, the present inventor has proposed a device for guiding the player in performance of the keyboard instrument (U.S. Ser. No. 68,375 filed on Aug. 21, 1979, now abandoned).

Briefly, this prior art guiding device is comprised of indicating means associated with each of the keys necessary to be operated in the performance of a tune and actuating means associated with said indicating means and operable for actuating said indicating means sequentially for indicating to the player the keys to be depressed sequentially during the performance of the tune.

In this guide device, the player is unable to learn fingering because he is required only to strike the key in accordance with indication by the indicating elements and thus he may strike the keys even with his index fingers, when so desired. In practicing on the keyboard instrument, such as piano, special importance is attached to fingering according to which five fingers are allotted to, for example, the keys of one octave interval. Thus in case of a right hand, the thumb and index finger are allotted to 'do' and 're' sounds, respectively. In the light of this, the prior art guide device has much to be desired for acquiring a full mastery of fingering. In addition, the player may be frequently unable to follow up the indication of the indication elements in a short time. Besides, the device tends to be costly.

OBJECTS AND SUMMARY OF THE INVENTION

It is therefore an object of the present invention to provide a device for guiding a player in the performance of a keyboard instrument in which a number of indicating or display elements corresponding to an extent of the keyboard capable of being acted upon by five fingers, such as one octave interval, are combined into a movable indicating plate for indicating the keys corresponding to the next note on the musical score, said plate being shifted for example by one octave interval when the next note on the score should fall outside the zone of indication by the movable indicating plate for subsequent indication of said next note by said indicating elements.

It is also an object of the present invention to provide the device for guiding the player in which the player may play the instrument as he moves his arm as instructed by the moving plates to get a full mastery of fingering in a shorter time.

It is also an object of the present invention to provide the device for guiding the player in which automatic key striking means and actuating means therefor are provided in addition so that the chord part may be played automatically as the player plays the melody part under instructions given by said indicating plate and indicating elements or vice versa.

In view of these objects, the device for guiding the player in performance of the keyboard instrument according to the present invention comprises movable indicating means having a predetermined number of indicating elements corresponding to keys of the keyboard instrument, shifting means associated with said indicating means, means for actuating said indicating elements on said indicating means for sequentially designating the keys to be acted upon while the player plays a tune, and means for exciting said shifting means for shifting said indicating means to a position capable of indicating a key corresponding to the next note on the musical score by said indicating elements when the key corresponding to said next note is outside the zone of indication of the movable indicating means.

BRIEF DESCRIPTION OF THE DRAWINGS

FIG. 2 is a schematic top plan view of the present device.

PREFERRED EMBODIMENTS OF THE INVENTION

Reference is had to the accompanying drawings illustrating the first embodiment of the performance guiding device of the present invention in the event that the device is mounted on an 88-key piano.

Figure 3A:
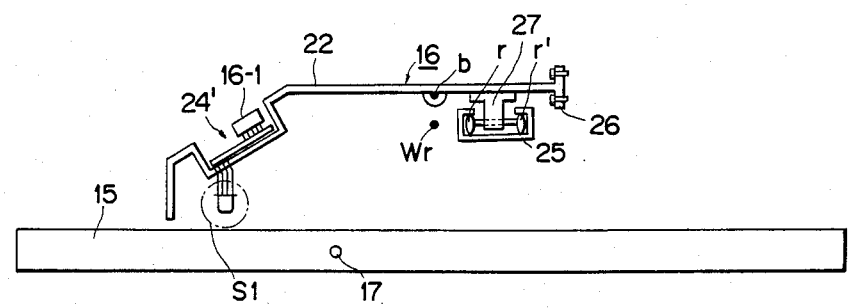
FIG. 3a and 3b are schematic elevational views showing the sensor means according to a first embodiment of the invention and showing the state before and after depression of the key, respectively.

Referring first to FIGS. 1, 2, 3a and 3b, a guide rail in the form of a channel bar 25 is mounted fixedly for the overall transverse extent of the piano. The guide rail 25 is preferably mounted in the place where the conventional keyboard pressor is to be mounted, the guide rail 25 thus taking over the function played by the pressor, which is now removed. A movable indicating plate 16 for the player's right hand and another movable indicating plate 16' for the player's left hand are mounted on the rail for sliding movement transversely or in the left and right direction in FIG. 1. As shown in FIG. 3a, a pair of rolls r, r' mounted to the movable indicating plate 16 by means of a roll shaft mounting block 27 are engaged in the guide rail 25 so that the plate 16 is not tilted forwardly during transverse sliding movement along the rail. Referring to FIG. 2, a wire Wr connected at a to the plate 16 is coiled around a set of guide pulleys P1, P2 and coupled at b to the plate 16. Another wire Wr' connected at c to the plate 16' is coiled around another set of guide pulleys P3, P4 and connected at d to the plate 16'. The pulleys P2, P3 are secured to output shafts of pulse motors M1, M2, respectively.

The indicating plates 16, 16' are of a width at least equal to the width of five contiguous white keys and provided with sound note indicating elements 16-1, 16-2, ... 16-8 and 16'-1, 16'-2, ... 16'-8 in positions registering with five white keys and three black keys in the keyboard in the aforementioned width of the five contiguous white keys. The width of the indicating plates 16, 16' may also be equal to the width of eight consecutive white keys or one octave interval. Each of the sound note indicating elements 16-1 through 16-8 and 16'-1 through 16'-8 is comprised of eight light-emitting diodes (LED's) a through h arranged in the form of sound notes and molded integrally into a molded resin body with a terminal being drawn out of each said diode. The eight resin bodies are placed in a side-by-side relation in a horizontal groove 24' of a profile plate 22 of synthetic resin (see FIG. 4b), which is to be the main body of the movable indicating plate 16, and are bonded thereto with an adhesive at a constant interval equal to the average key pitch. Conductors a'-1 through a'-8 are led out from the diodes a through h and connected to a driving circuit 80 of a control device 13 of an electronic micro computer (see FIG. 5a). Although not shown, the indicating plate 16' and the elements 16'-1 through 16'-8 are constructed similarly to the indicating plate 16 and the elements 16-1 through 16-8. Although two movable indicating plates 16, 16' are shown in FIG. 2 to be mounted on the single rail 15, two such rails may be provided for receiving the indicating plate 16 for right hand and the indicating plate 16' for left hand separately. In this case, there is no risk of the two movable plates coming into collision with one another during performance. Pulse motors M1, M2 and pulleys P1, P2, P3 and P4 may then be associated separately with the movable indicating plates on these guide rails.

Figure 1:
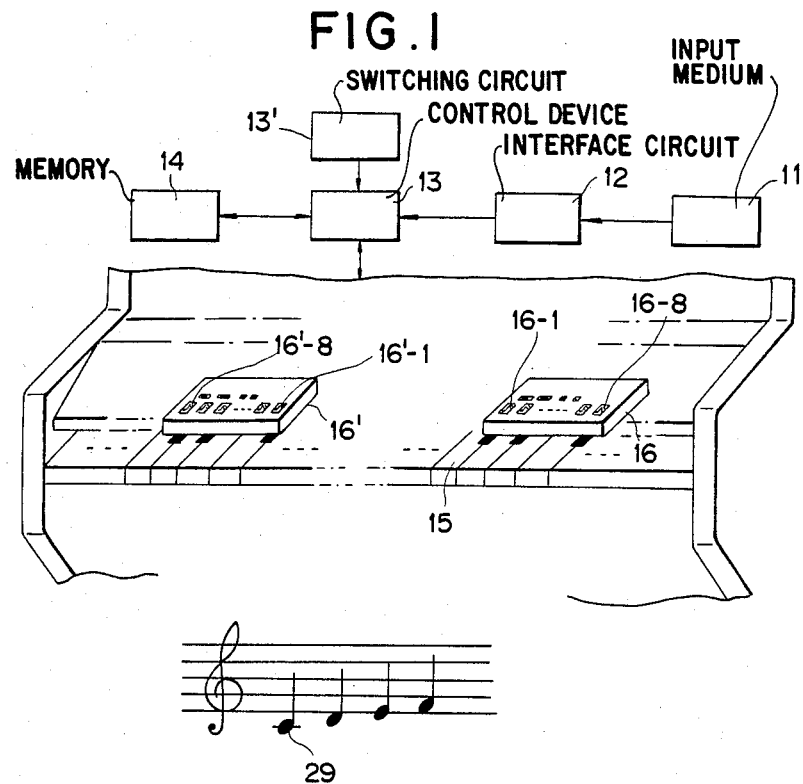
FIG. 1 is a perspective view showing the present device, with a computer portion being shown schematically in a block form.

Referring to FIG. 1, the numeral 11 designates an input medium such as magnetic tape, floppy disk sheet, punch card for encoding the pitch and sound duration of musical notes and tempo marks included in a musical score. The numeral 12 designates an interface circuit for matching the voltage level. The numeral 13 designates a control device for the electronic microcomputer and the numeral 13' a switching circuit including a start switch and a lamp indicating that the data entry into a memory 14 of the microcomputer has been completed. When the player has recognized the turning on of the indicating lamp and depressed the start switch of the switch circuit 13', the control device 13 is activated to read out from memory 14 the data of the first sound note of a melody part and of the first sound note, if any, of the chord part of a tune, as will be described below. The control device 13 is comprised of a switch state sensing circuit 90 for sensing the depression of a key or the release of the depressed key, a drive circuit 80 responsive to the sensing circuit 90 to read out sequentially from the memory 14 the binary data concerning the note(s) of the melody part to be played simultaneously and activate the light-emitting diodes 16-1 through 16-8 as later described, and exciting circuits 300, 301 associated with shift units for the indicating plates 16, 16' whereby the indicating plates 16, 16' are shifted when the keys for the next note(s) happen to be outside the range of indication of the eight elements 16-1 through 16-8 or 16'-1 through 16'-8 of the plates 16, 16'. The distance the indicating plates 16, 16' are shifted by the operation of the energizing circuits may be selected as desired during programming as will become clear as the present description proceeds.

The interface circuit 12, the control circuit 13, the switching circuit 13' and memory 14 are integral components of the electronic microcomputer annexed to the piano. Conductor wires are led out from the circuit 12 for connection to the outside input xedium 11, while connection cords are led out from the control device 13 for connection to bottom parts 23 of the indicating plates 16, 16'.

Figure 3B:
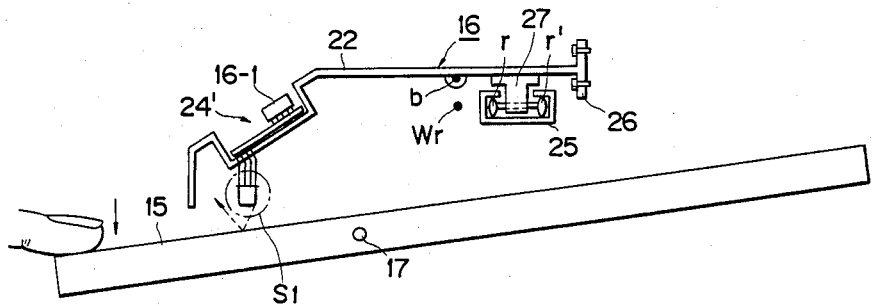
Figure 3C:
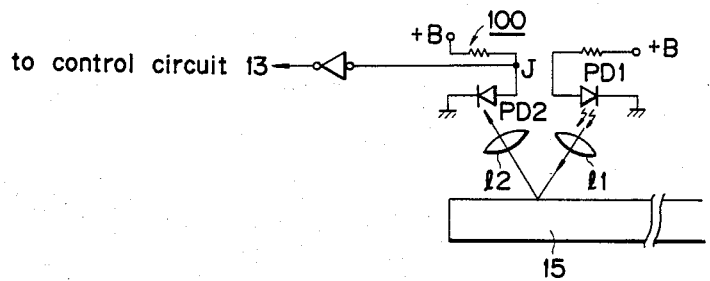
FIGS. 3c and 3d are detailed views showing the portion surrounded by circles in FIGS. 3a, 3b, 3e and 3f and showing the operating principle of the contactless switch corresponding to said portion surrounded by circles.
Figure 3D:
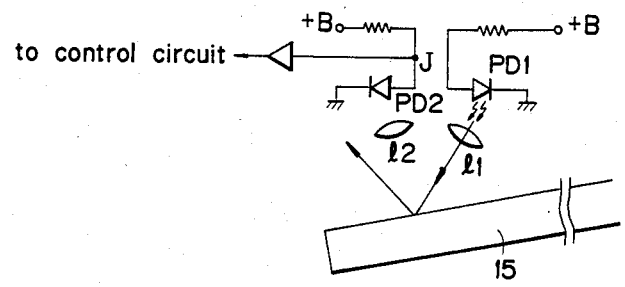

Reference is had to FIGS. 3a through 3d illustration of the sensor circuit 90 for sensing the depression by the player of a key for the melody part of the tune, or release by the player of the depressed key. Although FIGS. 3a through 3d show only one indicating element 16-1, by way of illustrating the sensing operation, the following description applies naturally to the remaining indicating elements. The portions within chain-dotted line circles in FIGS. 3a and 3b correspond to a switch S1 shown in FIG. 5a and designed as a unitary photosensor or magnetic sensor type contactless switch assembly. The switches S2 through S8 are designed in the similar manner. Alternatively, switches similar to the switches S1 through S8 may be provided to the keys on the keyboard coming into use during performance. FIGS. 3c, 3d show the operating principle of the contactless switch assembly. Thus, in FIG. 3c, corresponding to FIG. 3a, the white key 15 associated with the switch assembly is not depressed whereas in FIG. 3d corresponding to FIG. 3b, the white key is depressed. Referring to FIG. 3c, the light rays from the light-emitting diode PD1 is received by the light-receiving diode PD2 through lenses l1, l2 as long as the key 15 is not pressed by the player. Thus the current from the +B source is grounded through the light-receiving diode PD2 so that the control signal is not sent to the sensor circuit 90 of the control device 13. The switch S1 is closed at this time. When the player has pressed down the key as shown in FIG. 3b, the light rays from the diode PD1 are no longer received by the diode PD2 and thus the current from the +B source flows to the circuit 90 of the control device 13 as shown in FIG. 3d. The switch S1 is opened in this state.

The control device shown in the block form in FIGS. 5a through 5d has the sensor circuit 90 grounded through the switches S1 through S8 and connected through a pull-up resistor circuit 100 to, for example, a positive source of 5 volt.

Since the switch S1 is opened and closed upon depression and release of the key, respectively, the voltage at a junction J shown in FIGS. 3c and 3d is changed from 0 volt to 5 volt at the instant of key depression and from 5 volt to 0 volt at the instant of key release. Therefore, when the circuit 90 is designed to produce a binary '1' upon the detection of the positive going state of the control signal, the next indicating element is activated upon depression of the associated key. When the circuit 90 is designed to produce a binary '1' control signal upon detection of the negative going state of the control signal, the next element is activated upon release of the depressed key.

Figure 9:
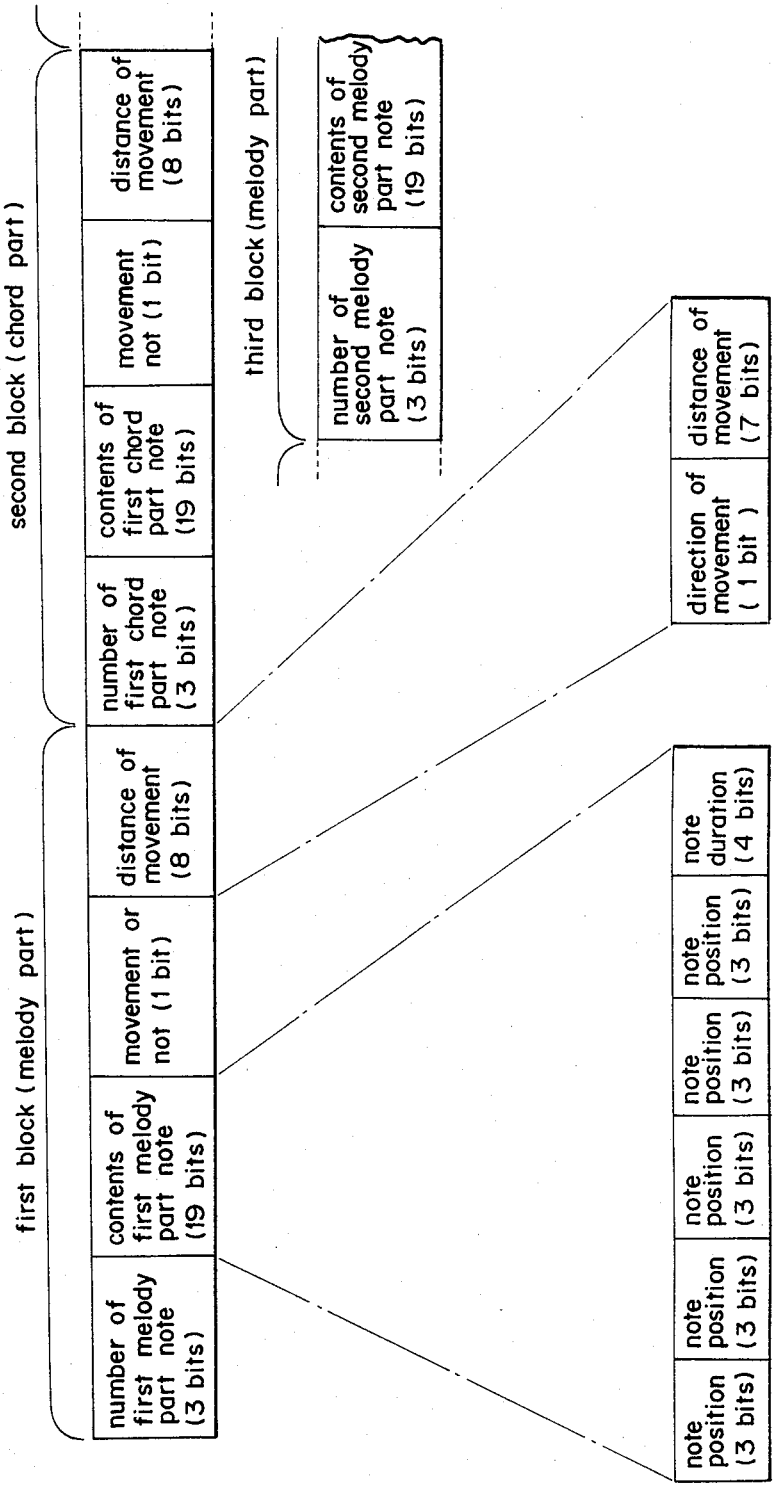
FIG. 9 shows memory blocks.

Upon generation of the binary '1' in the sensing circuit 90, the control device 13 proceeds to reading out of the next block in the memory 14 such as third block for the melody part (see FIG. 9). During read-out of the sound note data of the melody part for this block, the control device 13 delivers control signals to one wire of the key position designating portion of the driving circuit 80, to selected ones of the wires a'-1, b'-1, ... h'-1 of the note length designating portion and to terminals of activating circuits 300, 301 as later described.

Figure 4A:
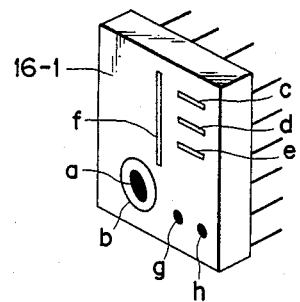
FIG. 4a is a perspective view of a note indicating element.

The construction and arrangement of the sound note indicating elements 16-1 through 16-8 and 16'-1 through 16'-8 is now described by referring mainly to FIG. 4a. It is to be noted that, although the following description is made only of the indicating element 16-1, the remaining elements are similarly arranged to the element 16-1.

Figure 8:
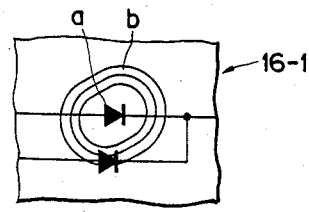
FIG. 8 is a fragmentary top view of a portion of the indicating elements.

A variety of symbols and marks, such as clefs, notes, rests, dotted notes, tempo marks, dynamics, expression marks and various other symbols are used in a musical note, the most critical of these being the note representative of the sound pitch and duration. Among the notes are whole notes, half notes, quarter notes, quaver notes, semiquaver notes and quarter-quaver notes, for indicating the various sound durations, these being indicated by tadpole-like symbols. These symbols may be indicated visually by selective driving of the eight LED's a through h shown in FIG. 4a according to a predetermined combination. Thus, the whole note can be indicated by driving only the LED b; the half note by driving LED's b and f; the quarter note by driving LED's a and f; the quaver note by driving LED's a, c and f; the semi-quaver note by driving LED's a, f, c and d; and the quarter-quaver note by driving LED's a, f, c, d and e. In the indiating element 16-1 shown in FIGS. 4a and 8, the LED's a through h are embedded in an integrally molded resin body or base according to a specific configuration as shown. For example, the diode a is in the form of a solid circle and the diode b in the form of a ring around the diode a. The other LED's c through h are embedded in the similar manner in the base. Eight lead terminals and one +B voltage terminal are led out from the base and connected to the control device 13 so as to be sequentially driven according to the binary coded signals read out by the control device 13.

In FIG. 4a, the marks g, h are LED's representative of dotted musical notes. In the present embodiment there are fourteen different levels of sound duration that may be represented by four bits, one such level being specified by a four bit string. On the other hand, the eight indicating elements are specified by three bits. The pitch and duration of a given note are specified by 4+3=7 bits.

In the event that five notes of the melody part for example are played simultaneously, these notes need be displayed simultaneously on the indicating elements 16-1 through 16-8, the number of bits necessary for such display being 3 multiplied by 5 added to 4 equal to 19 bits. In this case it is assuemd that each note is of the same duration, such as quarter note.

Figure 5A:
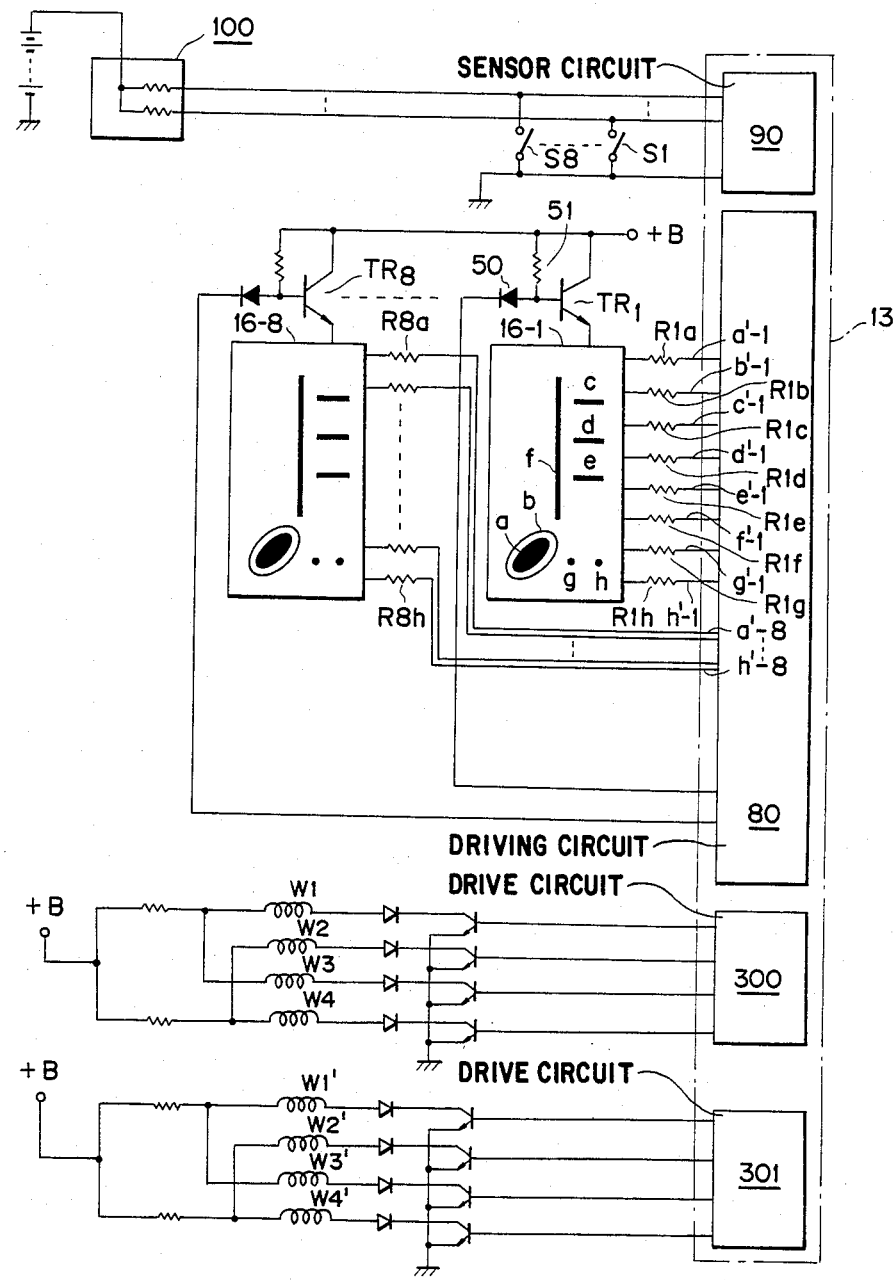
FIG. 5a is a schematic connection diagram showing a portion of the present device according to the first embodiment cooperating with the control device of the micro-processor.
Figure 6:
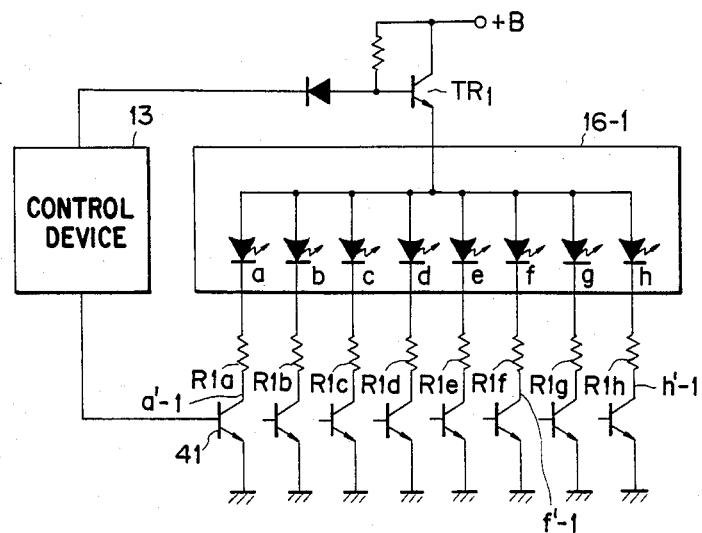
FIG. 6 is a detailed connection diagram showing a portion of FIG. 5a and 5c.

Referrence is had to FIGS. 5a and 6 for illustrating the operation of the driving circuit 80. Although FIG. 5a shows only the indicating elements 16-1 through 16-8 of the indicating plate 16, the elements 16'-1 through 16'-8 are similarly associated with the driving circuit 80. In FIG. 5a, the right side block is the control device 13 shown in FIG. 1. Eight wires are connected to the circuit 80 and to the bases of transistors TR1 through TR8 associated with the indicating elements 16-1 through 16-8. In FIG. 5a, only the elements 16-1 and 16-8 have been shown for simplicity. Referring only to the indicating element 16-1, one of eight wires in the lower section of the driving circuit 80 is connected to the base of transistor TR1 through diode 50 having the polarity as shown. The junction point between the diode 50 and the base of transistor TR1 is connected through bias resistor 51 to a conductor connecting the transistor TR1 and the +B voltage source. This conductor is connected in common to transistors TR1 through TR8.

The eight wires in the lower portion of the circuit 80 make up the key position designating section. The control device 13 operates to read out the next key position for the melody part responsive to actuation of a key corresponding to a note of the melody part and an electrical voltage is applied only to the conductor corresponding to the selected key so that transistor TR1, for instance, is fired. The eight wires $a'$-1, $b'$-1, ... $h'$-1 are connected via resistors R1$a$, R1$b$, ... R1$h$ to the element 16-1 to make up the note duration designating section. The remaining elements, such as element 16-8, are connected to the device 13 by eight wires R8$a$, R8$b$, ... R8$h$ drawn out therefrom and connected to wires $a'$-8, $b'$-8 ... $h'$-8 of the driving circuit 80. When the note being read out is the quarter note, the LED's a and f are activated. To this effect, the cathode side of the LED's a through h of the element 16-1 is connected via resistors R1$a$ through R1$h$ to collectors of eight transistors 41 connected in a common emitter configuration (see FIG. 6). The base potential of the transistor 41 is controlled by the control device. With the indicating element thus selected by the control device 13, control voltage is applied from the control device 13 to the bases of transistors 41 associated with the LED's a and h. Since transistor turned on as discussed above, only the LED's a and f of the indicating element 16-1 connecting to the wires $a'$-1 and $f'$-1 are activated for display of the quarter note. In this manner, the shape of the quarter note is displayed on the indicating element 16-1 in FIG. 1. The player may then press down the white key 15 corresponding to this indicating element 16-1 for one second corresponding to the quarter note. The time interval for key actuation need not be one second but may be of any desired duration.

Figure 5B:
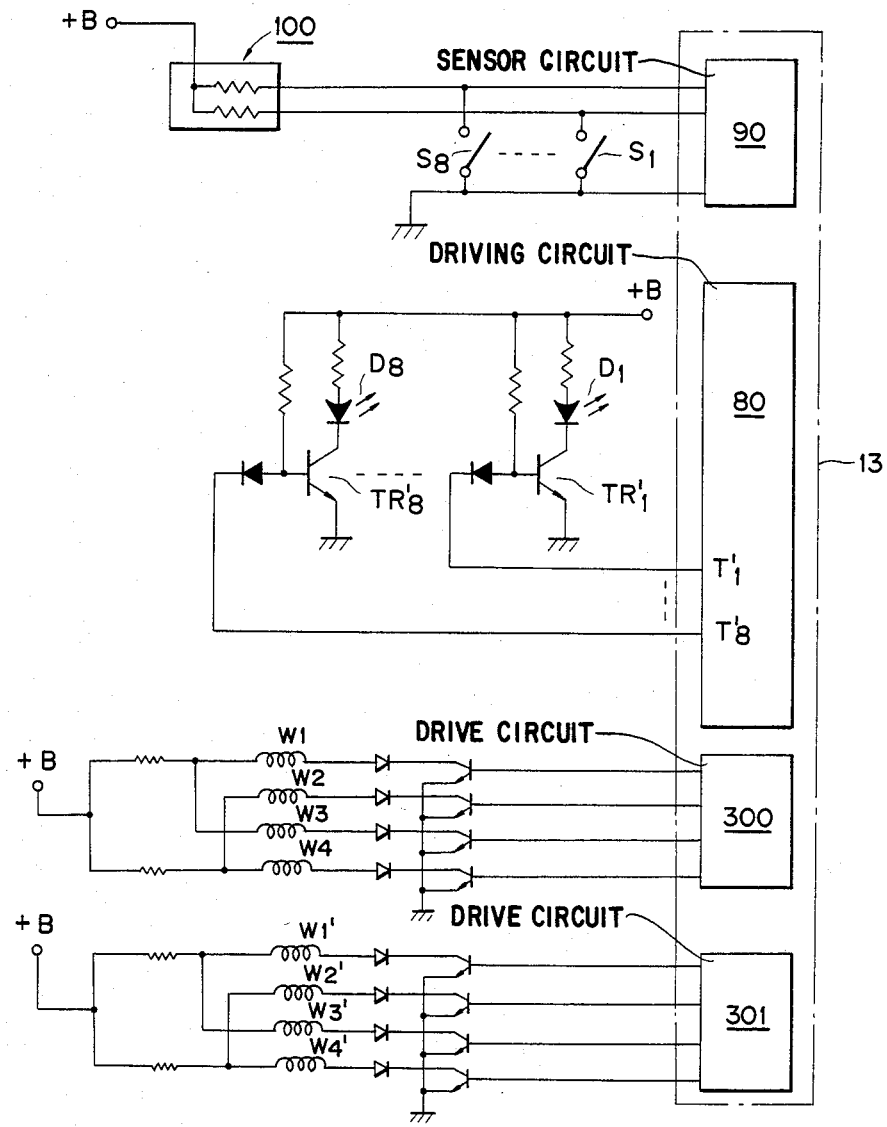
FIG. 5b is a view similar to FIG. 5a and showing a modification in which unitary light emitting diodes are used in place of respective diode groups.

In the event that each one light emitting diode or lamp $D_1$ through $D_8$ is used as indicating element in place of a group of eight light emitting diodes a through h arranged in the form of notes, the circuit shown in FIG. 5b is employed in place of the driving circuit shown in FIG. 5a.

Although the following description is made of the indicating elements provided to the movable indicating plate 16, it is to be noted that the indicating plate 16' is constructed similarly to the indicating plate 16. The indicating elements consists of unitary LED's or lamps D1 through D8 instead of LED groups. The anode sides of the LED's D1 through D8 are connected to a +B voltage source while the cathode sides thereof are connected to collectors of transistors TR'1 through TR'8, the bases of which are connected separately to terminals T'1 through T'8 of the control device 13 through diodes having the polarity as shown. The control device 13 is responsive to the depression of a key corresponding to a certain melody note in the musical score to road out the key position corresponding to the next note in the melody part 14 (and in the chord part, if any) to elevate the voltage at the corresponding terminal (such as T'8) e.g. from 0 to +24 volt. In this manner, a base potential is applied to the base of transistor TR8, which is thereby fired to illuminate the diode D8 to advise the player of the next key position. Although the duration is not indicated in this case, the player may depress the key for a suitable time interval, especially when the player is well aware of the tune. The control device 13 then senses the key depressed or the release of the depressed key to start the read-out of the next note. However, the diodes may be turned on and off at a specific frequency to inform the player of note duration. In this case, too, the duration is encoded in four bits and the control device 13 is designed to read out encoded data and to turn the diodes $D1 \sim D8$ on and off by different on/off frequencies indicative of the sound note duration.

The guidance device of the present invention is comprised of the movable indicating plates 16, 16' for the player's right and left hands, so that the player's right and left hand positions are indicated as the positions of these plates 16, 16', in order to help the player to master the fingering that is critical in practicing the piano. These plates 16, 16' are placed usually at the leftward extreme position in FIG. 1. This may be realized by moving the plates manually upon power throw off. Alternatively, the program stored in the memory 14 may be so prepared for shifting the plates 16, 16' to the abovementioned position at the end of performance of the tune. The center to center distance between neighboring indicating elements 16-1 through 16-8 or 16'-1 through 16'-8 is selected to be equal to the center to center interval between the neighboring keys. Moreover, the indicators are mounted to the indicating plates so that the centerlines of the elements mounted on the indicating plates are approximately aligned with the centerlines of the white and black keys covered by the indicating plate (more strictly, the centerlines of these white and black keys in the neighborhood of the keyboard pressor).

Therefore, in the rest position, the plate 16' is placed opposite to the first to eighth key on the keyboard while the plate 16 is placed opposite to the ninth to sixteenth keys on the keyboard, when counting from the left side end in FIG. 1. The totality of notes included in a given tune is encoded in the binary form with this start or rest position as reference and stored in the memory 14.

It is not practical that the totality of the notes of the melody part of a given tune be in registry with the keys indicated by the elements 16-1 through 16-8 of the movable indicating plate 16 lying in an arbitrarily selected position (in this case, five white keys and three black keys), but certain notes will be situated naturally out of the zone of indication by the indicating plate 16. It is then necessary to shift the plate 16 towards left or right. It is within the reach of those skilled in the art to type the notes of a tune encoded in the binary form in accordance with fingering rules so that the number of times of shifting and the shift distance may be minimized.

Figure 7A:
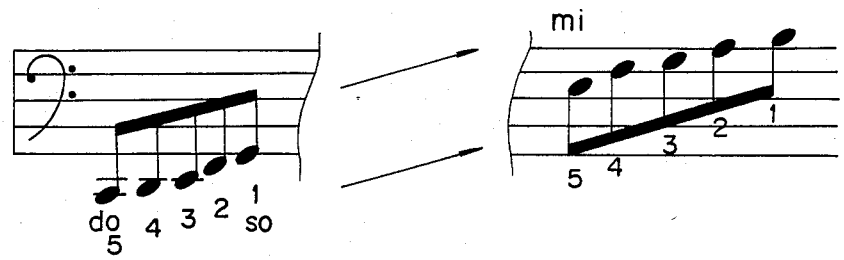
FIGS. 7a and 7b show portions of a musical score for performance with left and right hands.
Figure 7B:
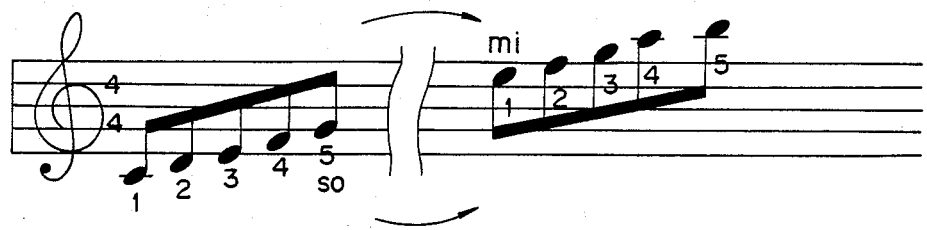

The shift distance may be only one key interval or over an octave interval as for instance when the next note jumps to a high pitch zone as shown in FIG. 7b. In the latter case, the player is required to move his arm correspondingly. When the shift distance is determined in terms of the number of keys, the maximum shift distance is $88-16=72$ keys (or $88-8=80$ keys with use of two guide rails) and may be represented with 7 bits. One more bit is required to indicate the left direction with "1" and the right direction with "0" so that the shift distance of the plate 16 towards left and right is represented by 8 bits. The totality of notes of the melody part thus encoded is stored in the memory 14 along with the totality of the chord part encoded in the similar manner. The contents of binary data stored in the memory 14 are shown in FIG. 9. Thus the first note of the melody part is stored in the first block, and the first note of the chord part is stored in the second block. In the similar manner, the second note of the melody part, the second note of the chord part and the third note of the melody part etc. are stored in the third, fourth and fifth blocks and so forth. In the first block are stored 3 bits indicative of the number of first notes of the melody part, 15 bits indicative of pitch levels of five notes at the maximum, 4 bits indicative of note duration, 1 bit indicative of whether the plate should be shifted or not and 8 bits indicative of the distance and direction of shift. The memory area may be used effectively by postulating that the second block follows the shift bit zero. In the second block are stored 3 bits indicative of the number of first notes of the chord part, 15 bits indicative of pitch levels of five notes at the maximum, 4 bits indicative of note duration, 1 bit indicative of whether the plate is to be shifted or not and 8 bits indicative of distance and direction of shift, provided that the shift bit is "1". The remaining notes of the melody and chord parts are stored in the similar manner in the memory 14. With the plates 16, 16' situated in the left end, the plate 16 is shifted by the shift bit "1" and the following 8 bits to a position in which the left end element 16-1 for example is located opposite to the fortieth key (in the score shown to the bottom of FIG. 1, the note 29 is "do" of C major and corresponds to the fortieth key in the 88-key piano counting from the first key and including the black keys). Referring to FIG. 5a illustrating the shifting device, the numerals 300, 301 designate pulse motor driving circuits for the melody and chord parts, respectively (shift device activating circuit). Exciting coils W1 through W4 and W'1 through W'4 for pulse motors M1, M2 are connected to the +B voltage source and to the activating circuits 300, 301 through transistors and diodes having the polarity as shown. Each time a control pulse is issued from each of the drive circuits 300, 301, the exciting coils W1, W2, W3, W4, or the coils W'1, W'2, W'3, W'4 are excited in this or the reverse order. Thus the pulse motors M1, M2 are turned by an angle α stepwise in the forward or reverse direction so that the plates 16, 16' are shifted stepwise towards left or right in FIG. 2 through wires Wr, W'r. The distance the plate 16 or 16' traverses for one control pulse is equal to α/n, where n stands for an integer, so that the plate is moved one key interval upon reception of n pulses. The plates 16, 16' may be shifted in the similar manner as the first note of the chord part (second block), the second note of the melody part (third block) and the second note of the chord part (fourth block) et seq. are read out consecutively. When the plate 16 has been shifted to a position in which the element 16-1 thereof is located opposite to, for example, the fortieth key, the shape of a quarter note, for example, is displayed by the element 16-1, as described by referring to FIG. 5a.

Pulse motors M1 or M2 may be replaced by so-called linear pulse motors with linear stator parts. In this case, the scale part of the linear pulse motor may be used as guide rail. In addition, the resolving power may be improved as compared to the conventional pulse motors.

FIG. 7a shows a portion of a musical score for performance of the chord part with left hand. There is a skip from a sound "so" to a sound "mi" one octave higher. The arrow marks represent the direction of shift of the plate 16' and hence that of the player's left arm. FIG. 7b shows a portion of a musical score for performance of the melody part with right hand. There is a skip from a sound "so" to a sound "mi" one octave high and the arrow marks represent the direction of shift of the plate 16 and hence that of the player's right arm.

Figure 3E:
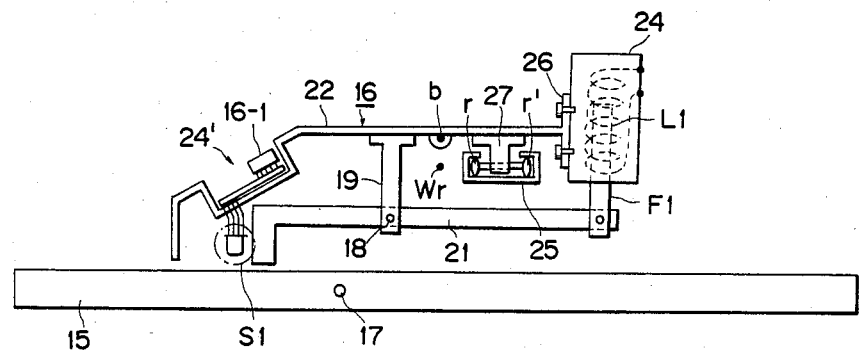
FIGS. 3e and 3f are schematic elevational views corresponding respectively to FIGS. 3a and 3b and showing the operation of the sensor means and the automatic key striking means according to a second embodiment of the invention.
Figure 3F:
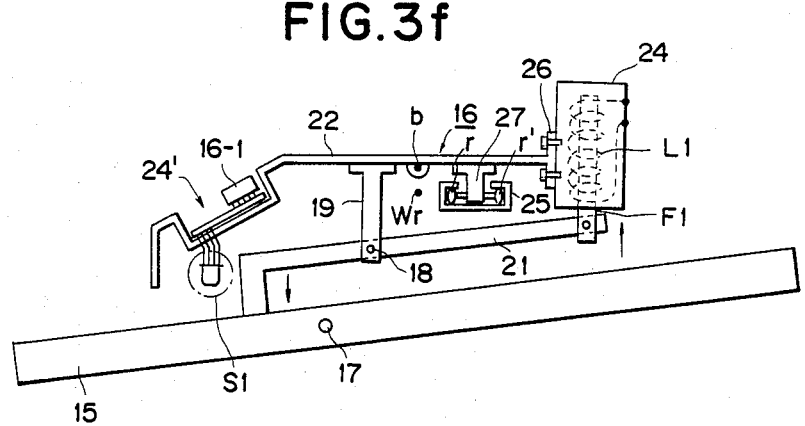
Figure 4B:
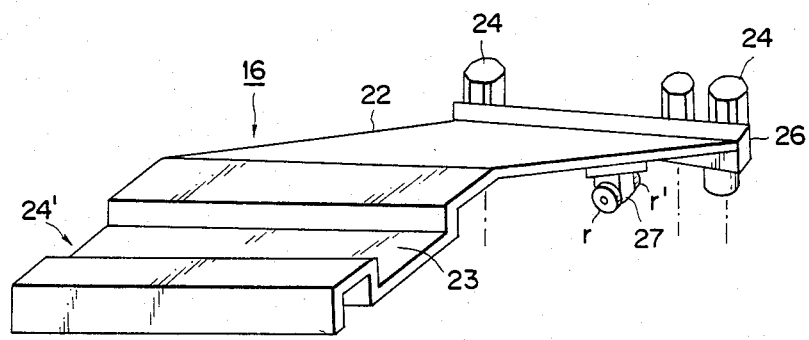
FIG. 4b is a perspective view of a movable indicating element.

A second embodiment of the present invention is now described, in which the melody part is played by the player under instructions of the indicating plates 16-1 through 16-8 and the chord part is played automatically by an automatic key striking device. Conversely, the chord part may be played by the player and the melody part played automatically. Referring to FIGS. 3e, 3f, and 4b, the numeral 24 designates solenoid case, the numeral 26 a flange for securing the solenoid cases 24, and the numeral 27 mounting blocks for rollers r, r'. In this embodiment, eight automatic key striking units shown in FIG. 4c are mounted to the lower surface of a profile plate 22 (see FIG. 4b) at a constant pitch corresponding to the mean key pitch, that is, in registry with the respective indicating elements 16-1 through 16-8.

Figure 4C:
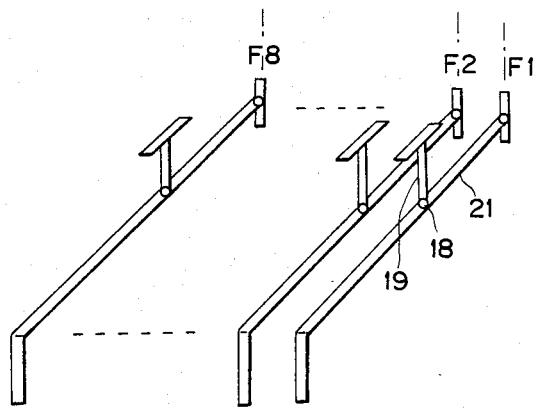
FIG. 4c is an exploded perspective view of the eight automatic key striking units to be mounted to the indicating plate according to the second embodiment.

The right end unit in FIG. 4c for example is comprised of a tee shaped plate 19, an angle bar 21 fulcrumed at 18 to the plate 19 and an iron core F1 supported by the inner end of the angle bar 21. Each of the iron cores F1 through F8 are intruded into solenoids L1 through L8 mounted in cases 24 mounted in turn to the indicating profile plate 16. Although the foregoing description has been made of the movable indicating plate 16 and the automatic key striking units associated therewith, the movable indicating plate 16' and the associated automatic units are constructed similarly thereto and are indicated by the same numerals with prime marks (') insofar as they are shown in the accompanying drawings. In the present embodiment, the automatic key striking device is made up by sixteen automatic key striking units.

Figure 5C:
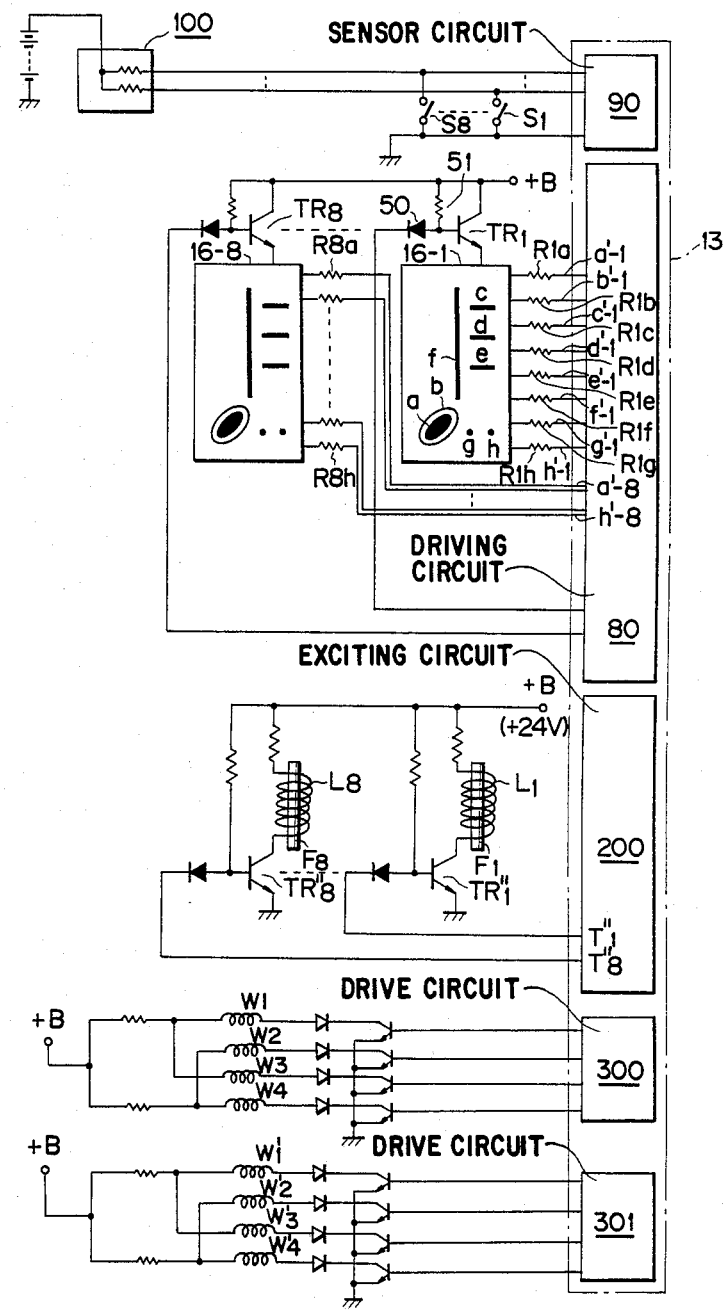
FIGS. 5c and 5d are connection diagrams for the second embodiment corresponding to FIGS. 5a and 5b, respectively.
Figure 5D:
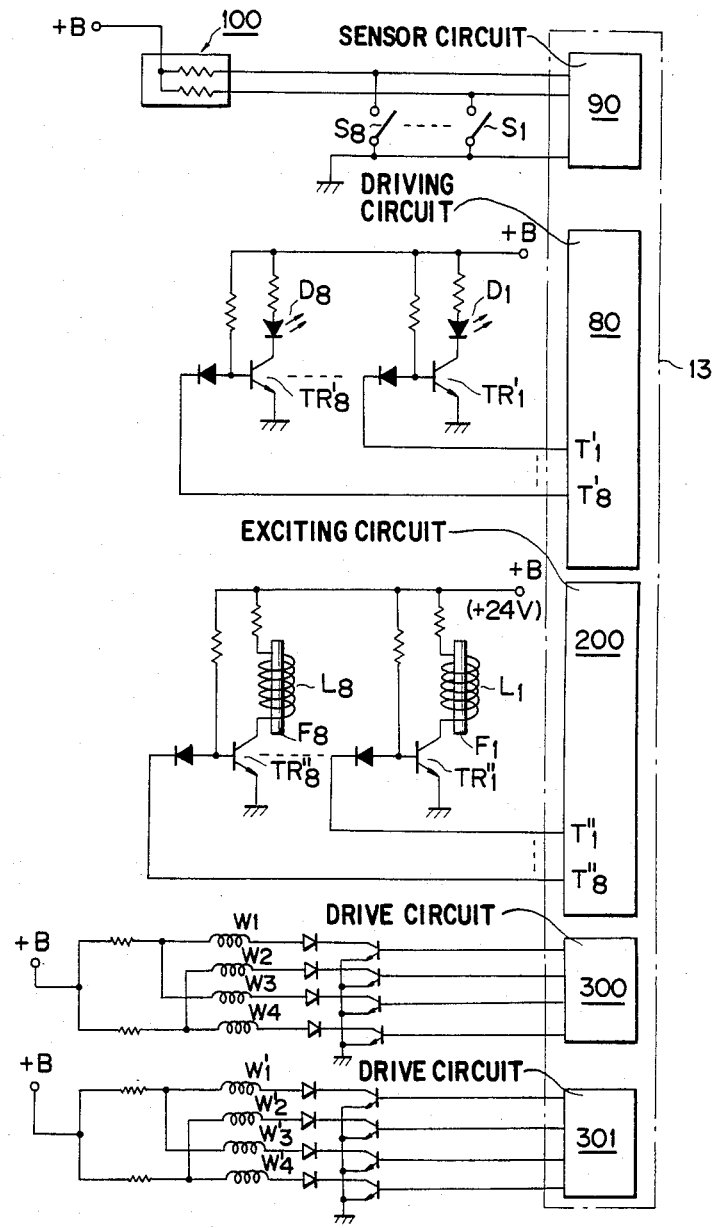

In the present embodiment, the control device 13 has an exciting circuit 200 responsive to the depression by the player of a certain key corresponding to a melody part note to read out from memory 14 the binary data indicative of a key corresponding to a chord part note for exciting the automatic striking unit corresponding to such key (see FIGS. 5c and 5d). Thus, when the circuit 90 has sensed the depression by the player of a certain melody part key, a control signal is issued to selected one of terminals T"1 through T"8, at the same time that control signals are issued to the circuit 80, 300 and 301.

Reference is now had to FIGS. 3e, 3f, 5c and 5d for illustrating the automatic key striking device and the associated actuating circuit 200 in the control device 13.

Although the unit associated with the element 16-1 only is shown in FIGS. 3e and 3f, the remaining fifteen units making up the automatic depressing units are constructed in the similar manner. FIG. 3e shows the state in which the iron core is not attracted as yet by the solenoid L1 and FIG. 3f shows the state in which the core is attracted by the solenoid L1.

As shown in FIGS. 5c and 5d, control terminals T"1 through T"8 are drawn out from the actuating circuit 200 of the control device 13. These control terminals T"1 through T"8 are connected through diodes to a +B voltage source (e.g. 24 volt) and to bases of transistors TR"1 through TR"8. The +B source is connected to transistors TR"1 through TR"8 through solenoids L1 through L8. When the control signal is received at the control terminal T"1, the potential at the terminal T"1 is elevated from 0 to, for example, +24 volt so that the transistor TR"1 is turned on and a magnetic field is produced in the solenoid L1. Therefore, the iron core F1 is intruded further into the solenoid L1 from the state shown in FIG. 3e to that shown in FIG. 3f so that the angle bar 21 is turned counterclockwise about point 18 for depressing the key 15 about fulcrum point 17.

The automatic key striking device may be annexed to the first embodiment and may be selectively activated subject to operation of a suitable switch provided in the switch circuit 13'.

The operation of the first and second embodiments is as follows: When the start switch, not shown, of the switch circuit 13' is activated by the player, the control device 13 is activated to read out the first block (melody part) and the second block (chord part) from memory 14 for illuminating for example the elements 16-1 and 16'-1 in the form of, for example, quarter notes, at the same time that the elements 16-1, 16'-1 are shifted to positions opposite to the keys associated with these notes. The player then actuates the keys opposite to the elements 16-1 and 16'-1 for one second for example. This depression of the melody note key is sensed by the circuit 90. Then the third block (melody part) and the fourth block (chord part) are read out, the plates 16, 16' are shifted if required, the note shapes are displayed in one or more of the elements 16-1 through 16-8 and one or more of the elements 16'-1 through 16'-8, and the player strikes the associated keys simultaneously. The performance of the tune is continued in this fashion. In the second embodiment, when the player actuates a key corresponding to, for instance, the first note of the melody part in accordance with display on the display elements, this actuation of the key is sensed by the circuit 90. The second block (chord part) is read out simultaneously with the first block (melody part) as mentioned above, the plate 16' is shifted if necessary, the note shape is displayed on one of the elements 16'-1 through 16'-8 positioned opposite to the key corresponding to the first chord part note, and the key is struck automatically by operation of the automatic key striking device and the actuating circuit associated therewith almost simultaneously with striking of the melody note key. The third and fourth blocks are then read out responsive to the depression of the first melody note key, the plates 16, 16' are shifted if necessary, and the note shapes are displayed on one or more of the elements 16-1 through 16-8 and one or more of the elements 16'-1 through 16'-8 for actuation of the associated keys by the player and the automatic key striking device. The performance of tune is continued in the similar fashion. In the second embodiment, if the duration of the whole note is set to one second, duration of the half note and quarter note is ½ and ¼ second, respectively, and so forth. Hence, 4 bits are required in encoding the duration of fourteen notes, while 3 bits are required in encoding the pitch. In addition, there are required 3 bits indicative of the number of notes, 1 bit indicative of whether the plate is to be shifted or not, and 8 bits indicative of the distance of shift in either directions. Since up to 5 keys may be actuated at a time, the maximum number of bits is $3 \times 5 + 4 + 3 + 1 + 8 = 31$ bits.

The indicating plate 16 for example is not shifted when the bit indicative of shift required or not required is zero. This means that the key associated with the note in subject is covered by the indicating plate 16. The plates 16, 16' are shifted naturally when the keys to be struck next are situated outside the display zone of the indicating plates 16, 16' (that is, the white and black keys covered by plates 16, 16'). However, even when the next keys are situated within the display zone of the indicating plates, the plates may have to be shifted as required by the fingering rule. It is the matter of programming technique to shift the plates in such case. What is critical above all it to prepare a program in accordance with the most effective fingering and in such a manner that the five white keys covered by the display zone of the indicating plate 16 may be struck with the player's thumb to small finger from left to right of the display zone.

When there is only one chord part note, the three bits indicative of the note number are "001" and, when there are five chord part notes, the three bits are "101". If there is no chord part note, the three bits are "000" and note shape is not displayed. In the case, no key is struck automatically. It should be noted that, when the shape of a note is displayed on one of the elements 16-1 through 16-8, performance is discontinued unless the player actuates the key associated wtih the melody note displayed on the indicating element. It is only after striking by the player of a melody part note key that the chord part note key associated therewith is struck automatically, the next notes of the melody and chord parts are displayed on one of the display elements 16-1 through 16-8 and oe of the elements 16'-1 through 16'-8 and the plates 16, 16' are shifted accordingly.

Alternatively, the sensing circuit 90 is rendered inoperative and the display elements are actuated sequentially at a certain rate as set by the program, the indicating plates being shifted as the occasion may demand. In this case, the player is required to have a certain skill because he or she has to strike the keys at the fixed rate as these keys are indicated by the display elements. However, in this case, the player is not necessarily required to strike the keys but may only see the display elements and the movement of the indicating plates to get accustomed to fingering and arm movement necessary for performance.

In case of a simple melody, the movable indicating plate for the left arm may be immobilized and only the indicating plate for the right arm may be used for performance only with right arms.

According to the present guidance device, mentioned hereinabove, fingering and arm movement can be learned easily because the player can move his or her arm in synchronism with movement of the indicating plates. The number of components such as display elements, electromagnets, solenoids and so forth may be reduced with resulting reduction in memory area and manufacture costs. When the player has acquired certain skill, he or she may play the melody part in accordance with display on the right side indicating plate and the chord part in accordance with display on the left side indicating plate.

Liquid crystals or fluorescent character display tube may be used in place of light emitting diodes for display of the note shape. In the event that the indicating lamps D1 through D8 are used in place of the light emitting diodes a through h for indicating the keys to be struck next time, note duration may be displayed in the form of lighting time intervals, colors or brightness of the lamps. Seven segment elements may be used for digital display such as "2" to stand for half notes. The data of notes of a tune may be entered in binary form in a nonvolatile memory such as PROM or core memory (memory 14) from which performance data are read out and displayed on the elements 16-1 through 16-8 through the control device 13. This memory is mounted as memory cassette in a cassette mounting position such as operating panel of the microcomputer along with the control device 13 of the computer.

Since the display elements are provided to the indicating plate for the chord part as well, the chord part may be played by the player under instructions of the display elements and the melody part played by the automatic actuating device. Alternatively, when the keys corresponding to one or both of the first notes of the melody and chord parts of a bar are struck by the player, the melody and chord parts may be played automatically until the end of the bar (or up to a certain number of notes) under control by the control device one or both of the first notes of the melody and chord parts for the next bar being displayed upon completion of performance of the bar. The melody and chord parts may be played by the automatic key striking device. In this case, since the display elements on the left and right side indicating plates are illuminated sequentially and the plates are shifted in one or the other direction in case of necessity, one can learn fingering and arm movement during automatic performance.

Thus, in accordance with the present invention, even the beginner may get accustomed to fingering or play the melody or chord parts by relying upon display on the movable indicating plates and movement of the indicating plates. It is to be noted that fingering according to the present invention may be attended easily when the programing is made so that, when even the plate 16, 16' are moved to new positions, element 16-1 of the plate for the melody part is always in register with the player's thumb and the element 16'-8 of the plate 16' is always in register with the player's little finger. In addition, since the automatic key striking device mounted to the movable indicating plates are shifted with the plates, any heat generated in the automatic key striking device may be dissipated by such shifting of the indicating plates.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A device for guiding the player in performance of a keyboard instrument comprising:
    movable indicating means having a predetermined number of indicating elements corresponding to keys of the keyboard instrument;
    shifting means associated with said indicating means;
    means for activating said indicating elements on said indicating means for sequentially specifying the keys to be acted upon while the player plays a tune; and
    means for exciting said shifting means for shifting said movable indicating means to a position capable of indicating a key corresponding to the next note on the musical score by said indicating elements when the key corresponding to said next note is outside the zone of indication of the movable indicating means.

2. The device as claimed in claim 1 wherein each of said indicating elements is a group of light emitting diodes configured and arranged to display the shape of a variety of notes when activated.

3. The device as claimed in claim 1 wherein each of said indicating elements is a unitary light emitting diode.

4. The device as claimed in claim 1 wherein eight indicating elements are provided to the indicating means for an extent equal to the transverse extent of the five contiguous white keys.

5. The device as claimed in claim 1 wherein thirteen indicating elements are provided to the indicating means for an extent equal to the transverse extent of the eight contiguous white keys.

6. The device as claimed in claim 1 wherein said shifting means comprises pulse motor means, pulley means secured to the output shaft of said pulse motor means and traction means placed around said pulley means and secured to said movable indicating means.

7. The device as claimed in claim 1 wherein said shifting means comprises servo motor means, pulley means secured to the output shaft of said servo motor means and traction means placed around said pulley means and secured to said movable indicating means.

8. The device as claimed in claim 1 wherein said shifting means comprises linear pulse motor means.

9. The device as claimed in claim 1 wherein said activating means is a part of a microcomputer.

10. The device as claimed in claim 1 wherein said exciting means is a part of a microcomputer.

11. The device as claimed in claim 1 wherein said movable indicating means consists of a first movable indicating plate for playing the melody part of a tune and a second movable indicating plate for playing the chord part of the tune, said shifting means consists of a first shifting unit associated with said first indicating plate and a second shifting unit associated with said second shifting unit, the indicating elements on said first and second movable indicating plates are activated by said activating means separately associated with said elements and wherein said first and second indicating plates are shifted by said exciting means separately associated with said first and second indicating plates.

12. A device for guiding the player in performance of a keyboard instrument comprising:
    movable indicating means having a predetermined number of indicating elements corresponding to keys of the keyboard instrument;
    shifting means associated with said indicating means;
    sensor means for sensing depression of a key or release of the depressed key while the player plays a tune;
    means for activating said indicating elements in response to sensing by said sensor means for sequentially specifying the keys to be acted upon while the player plays the tune; and
    means for exciting said shifting means for shifting said movable indicating means to a position capable of indicating a key corresponding to the next note on the musical score by said indicating elements when the key corresponding to said next note is outside the zone of indication of the movable indicating means.

13. The device as claimed in claim 12 wherein said sensor means comprises a magnetic sensor type contactless switch and a portion of microcomputer cooperating therewith.

14. The device as claimed in claim 12 wherein said sensor means comprises a photosensor type contactless switch and a portion of the microcomputer cooperating therewith.

15. The device as claimed in claim 12 wherein said movable indicating means consists of a first movable indicating plate for playing the melody part of a tune and a second movable indicating plate for playing the chord part of the tune, said first and second indicating plates being operatively associated with first shifting means and second shifting means, respectively;

said sensor means consists of a first sensor for sensing the depression of a key or release of the depressed key in the performance of the melody part and a second sensor for sensing the release of the depressed key in the performance of the chord part;

said activating means for activating said indicating elements consists of a first activating device responsive to sensing by said first sensor for activating said indicating elements on said first movable indicating plate for sequentially specifying the keys to be acted upon while the player plays the melody part, and a second activating device responsive to sensing by said second sensor for activating said indicating elements on said second movable indicating plate for sequentially specifying the keys to be acted upon while the player plays the chord part; and said exciting means consists of a first exciting device for exciting said first shifting means to a position capable of indicating a key corresponding to a next key in a musical score by said indicating elements when the key corresponding to said next note is outside the zone of indication of said first movable indicating plate, and a second exciting device for exciting said second shifting means to a position capable of indicating a key corresponding to a next key in the musical score by said indicating elements when the key corresponding to said next note is outside the zone of indication of said second movable indicating plate.

16. A device for guiding the player in performance of a keyboard instrument comprising:

movable indicating means having a predetermined number of indicating elements corresponding to keys of the keyboard instrument;

shifting means associated with said indicating means;

sensor means for sensing depression of a key or release of the depressed key while the player plays a tune;

means for activating said indicating elements in response to sensing by said sensor means for sequentially specifying the keys to be acted upon while the player plays the tune;

means mounted to said movable indicating means for cooperation with respective ones of the indicating elements thereof and adapted for automatically striking the keys;

means for actuating that portion of said key actuating means which is associated with the activated indicating element; and means for activating said shifting means during performance of the tune to a position capable of indicating a key corresponding to the next note on the musical score by said indicating elements when the key corresponding to said next note is outside the zone of indication of the movable indicating means.

17. The device as claimed in claim 16 wherein said striking means comprises a plurality of automatic key striking units each comprising a solenoid, a key-striking angle bar mounted to an iron core associated with said solenoid, and a profile plate carrying said angle bar and mounted to said movable indicating plate.

18. The device as claimed in claim 16 wherein the striking means cooperates with a portion of the microcomputer.

19. The device as claimed in claim 16 wherein said actuating means for actuating said striking means is a part of the microcomputer.

20. The device as claimed in claim 16 wherein said movable indicating means consists of a first movable indicating plate usable in playing the melody part of a tune and a second movable indicating plate usable in playing the chord part of the tune, said first and second indicating plates being operatively associated with first shifting means and second shifting means, respectively;

said sensor means consists of a first sensor for sensing the depression of a key or release of the depressed key in the performance of the melody part and a second sensor for sensing the release of the depressed key in the performance of the chord part;

said activating means for activating said indicating elements consists of a first activating device responsive to sensing by said first sensor to activate said indicating elements on said first movable indicating plate for sequentially specifying the keys to be acted upon by the player, and a second activating device responsive to sensing by said second sensor to activate said indicating elements on said second movable indicating plate for sequentially specifying the keys to be acted upon by the player;

means mounted to said first and second movable indicating plates for cooperation with respective ones of the indicating elements of said first and second indicating plates and adapted for automatically striking the keys;

means for actuating that portion of said striking means which is associated with an activated indicating element on said second indicating plate or first indicating plate specifying a key corresponding to a note of the chord part or melody part mating with a note of the melody part or chord part corresponding to the key struck by the player under instructions given by the indicating elements on said first or second indicating plate, actuation of said portion of the striking means taking place simultaneously with striking of the key by the player; and means for exciting said first and second shifting means during performance of the tune to positions capable of indicating keys corresponding to the next notes of the melody and chord parts of the musical score by said indicating elements when the keys corresponding to said next notes are outside the zone of indication of the first and second indicating plates.

* * * * *